J. H. STRINGHAM.
IGNITION DEVICE FOR EXPLOSIVE ENGINES.
APPLICATION FILED JULY 29, 1910.

1,203,072.

Patented Oct. 31, 1916.

UNITED STATES PATENT OFFICE.

JOHN H. STRINGHAM, OF JERSEY CITY, NEW JERSEY.

IGNITION DEVICE FOR EXPLOSIVE-ENGINES.

1,203,072.  Specification of Letters Patent.  Patented Oct. 31, 1916.

Application filed July 29, 1910. Serial No. 574,437.

*To all whom it may concern:*

Be it known that I, JOHN H. STRINGHAM, a citizen of the United States, residing at Jersey City, county of Hudson, and State of New Jersey, have invented certain new and useful Improvements in Ignition Devices for Explosive-Engines, of which the following is a specification.

My invention relates to an ignition device for explosive engines, wherein means are provided for trapping a portion of the combustion products of the explosion and thereafter returning them to the cylinder to ignite the succeeding charge.

It is applicable to all kinds of explosive engines and contemplates many modifications in its arrangement and construction, and I accordingly describe it in connection with a drawing which is illustrative only and designed to show in the plainest manner the preferred form of the features which are important.

Figure 1:
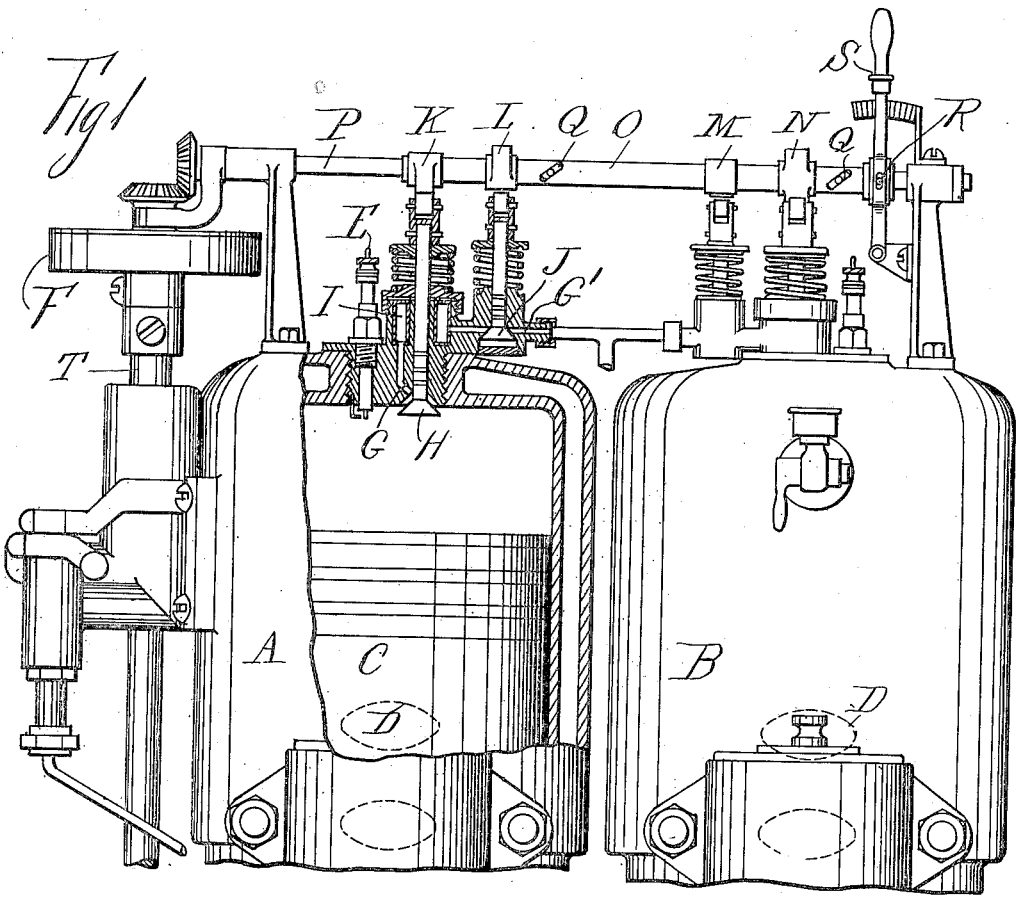
Figure 2:
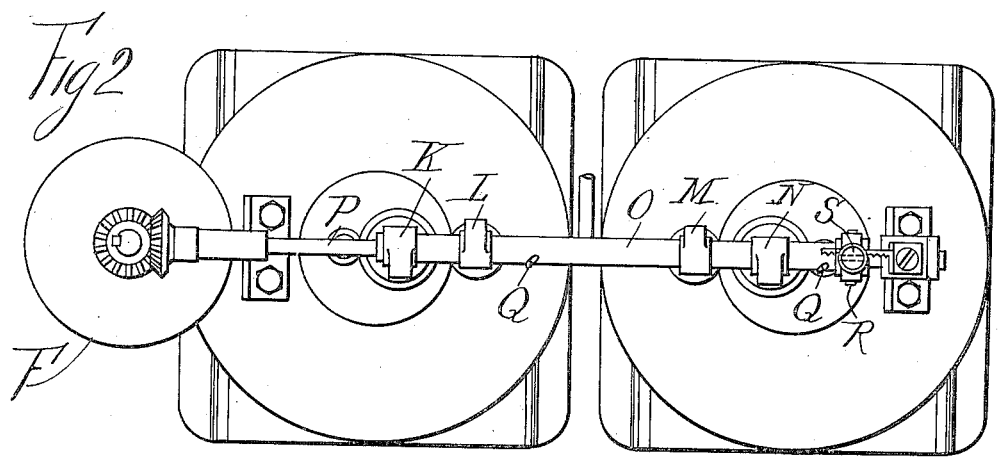

The drawing accordingly shows the device applied to a two cylinder engine of a usual type, Figure 1 being an elevation partly in section, and Fig. 2 a top view.

In the drawing, A and B indicate the cylinders, C the piston, D the main exhaust, E the electric spark plug, and F an electric timer, the electric timer being shown to indicate how the invention may be applied without interfering with constructions now in use.

G indicates a passage, or portion of the trap, opened and closed by the trapping valve H. I prefer to place the trapping valve at the point where the passage enters the cylinder because that insures the avoidance of a pocket wherein gases or products of combustion might accumulate and prematurely ignite the incoming charge. The trap may be any kind of a space which may be availed of to receive combustion products and hold them until released to ignite the succeeding charge. I prefer to have such trap in the form of a passage leading to a chamber, indicated by I, although my invention might be practised less advantageously if this space assumed other forms, the amount of combustion products necessary for ignition being small. In order that the ignition device may operate successfully, the trap should be of very small volume relative to the volume of the compression chamber, that is, the volume included between the end of the cylinder and the piston at the end of the compression stroke. The result of making the trap chamber small relative to this volume is that the pressure in the trap and in the cylinder are equalized when the two are in connection without materially changing the pressure in the cylinder and the equalization takes place very rapidly. It is desirable that the total cross-sectional area of the passage leading to the trap be substantially the same as that of the trap in order that the gases may not expand and cool in entering the trap. I prefer to have the trap lined with a heat-resisting material, such as asbestos, and when desired, cooling means, as a water jacket, may be used. Preferably, the trap is provided with a valve on the side away from the cylinder, also, as by extending the passage beyond the chamber, as indicated by G', and introducing a by-pass valve J. The purpose of introducing the by-pass valve is to provide for proper circulation through the trap in order that the same may be kept in condition for the best operation of the device. The passage may be further continued by a pipe leading to the main exhaust, or may terminate in the open air, as may be found convenient in the particular circumstances under which the invention is used.

In the drawing, the valves H and J are shown operated by springs and cams K and L coming in operative contact with rollers mounted on the valve stems. When the invention is applied to a single cylinder engine, the particular means employed for operating the valves are not especially important, but the preferred form illustrated in the drawing has peculiar advantages when applied to multi-cylinder engines.

In the drawing, the cams K, L, M and N are shown mounted on the hollow cam-shaft O, which is connected with the cam-rod P, which, in turn, is operatively connected with the shaft T. The cams are so shaped and arranged on the cam-shaft that the opening and closing of the valves of each cylinder are properly timed according to the operation of that cylinder and the consequent ignition in each cylinder is also properly timed in respect to the ignition in the other cylinders. Thus in the operation of cylinder A, the first explosion is ignited by an electric spark from the spark plug E. At the time of the explosion, the valve H is held open by the cam K until after the by-pass valve J has been opened and closed by the cam L and the spring, thus providing for circulation through the trap. The shape and arrangement of the cam K are such that the valve H is closed by its spring before the main exhaust valve opens. Thus hot combustion products of the explosion are trapped under high pressure and held in the trap until the next charge of gas is compressed and ready for ignition, when the valve H is again opened by the action of the cam K, the hot combustion products enter the cylinder and ignite the charge, then circulation through the trap is effected by the opening of the by-pass valve J, and then another trapping of combustion products is effected by the closing of the valve H. The ignition of each cylinder is, moreover, preferably timed with respect to the ignition of the other cylinders by the arrangement of the cams. Thus the cams K and L of cylinder A are in such position that they open the valves and ignite the charge in that cylinder the proper time in advance of the opening of the valves in cylinder B by the cams M and N, and so on, throughout any number of cylinders.

In the preferred form provision is also made for advancing or retarding, at the will of the operator, the ignition of all the cylinders without modifying their relative ignition in respect to each other, which remains fixed at the most desirable point. The mechanism for accomplishing this is as follows: The cam-shaft O is provided with slots Q and pins fixed in the cam-rod P operating in said slots, and provided with an eccentric R, operated by a lever S, or other convenient attachment, so that the cam-shaft O may be moved on the cam-rod P, with the result that the cams are advanced or retarded to come earlier or later into operative relation with the rollers of the valve stems and thus advance or retard the ignition. While I have shown a lever as the means for operating this mechanical timing device, it will be understood that in many engines some other operative mechanism, as rods or other connection leading to a more or less distant point, as, for example, the driver's seat of an automobile, will be preferable.

It is obvious that in view of the variety of explosive engines and the number of purposes for which they are used, my invention contemplates modification within wide limits in nearly all its parts according to the particular circumstances under which it may be applied. I believe that I am the first to provide means for the ignition of explosive engines by trapping some of the products of the combustion occurring in the cylinder and using them to ignite the succeeding explosion in the cylinder.

I claim:—

1. An ignition device for explosive engines comprising a trap connected with the cylinder and adapted to receive and hold a portion of the combustion products of the explosion at a temperature sufficient to ignite the succeeding charge, a valve between said trap and the cylinder, and means for operating said valve, whereby a portion of the products of combustion is trapped, held and returned to the cylinder to ignite the succeeding charge.

2. An ignition device for explosive engines comprising a trap connected with the cylinder and adapted to receive a portion of the combustion products of the explosion at a temperature sufficient to ignite the succeeding charge, a valve at the entrance of said trap to the cylinder, and means for operating said valve, whereby a portion of the products of combustion is trapped, held and returned to the cylinder to ignite the succeeding charge.

3. An ignition device for explosive engines comprising a trap connected with the cylinder, means for opening the same to permit the entrance of a portion of the combustion products at a temperature sufficient to ignite a succeeding charge, means for closing said trap to hold said products therein, and means for again opening said trap to return said products to said cylinder to ignite the succeeding charge therein.

4. An ignition device for explosive engines comprising a trap connected with the cylinder to temporarily collect products of combustion, a valve between said trap and the cylinder, means operating said valve prior to exhaustion of products of combustion from the cylinder, another structurally independent valve between said trap and the outside air, other means operating said last named valve to open and close it during operation of the first named valve, and an operative connection between said means and the main shaft of the engine.

5. An ignition device for explosive engines comprising a chamber connected with the cylinder, means for establishing communication between said chamber and the outside air, means for sealing said chamber from communication with the outside air while such chamber is in communication with the cylinder, and means for sealing the chamber against communication with the cylinder, whereby when said chamber is again placed in communication with the cylinder gases trapped therein by the operation of said means may escape to the cylinder to ignite a charge therein.

6. In an ignition device for explosive engines, a chamber connected with the cylinder by a passage having substantially the same cross-sectional area as said chamber, a valve in said passage, and means for opening said valve immediately before the time for each explosion and closing it after each explosion and before exhaustion of the products of combustion from the cylinder.

7. An ignition device for explosive engines comprising a chamber for temporarily collecting products of combustion, a passage connecting said chamber with the cylinder, a valve in said passage, means operating said valve prior to exhaustion of products of combustion from the cylinder, a passage connecting said chamber with the outside air, a second structurally independent valve in said last named passage, other means operating said second valve to open and close it during operation of the first named valve, and an operative connection between said means and the shaft of the engine.

8. An ignition device for explosive engines comprising means for trapping, holding and returning to each cylinder some of the products of combustion therein in combination with a mechanical timer consisting of a series of cams mounted upon a cam-shaft adjustably connected with a cam-rod, means for locking said shaft at any desired position on said rod, and an operative connection between said rod and the main shaft of the engine.

9. An ignition device for multi-cylinder explosive engines comprising a trap connected with each cylinder for products of combustion, a valve between said trap and cylinder, a cam operating said valve prior to exhaustion of products of combustion from the cylinder, another structurally independent valve between said trap and the outside air, a cam operating said last named valve to open and close it during operation of the first named valve, a common cam-shaft upon which the cams operating the valves of a plurality of cylinders are mounted, and a cam-rod operatively connected with the shaft of the engine and to which said cam shaft is adjustably connected.

10. An ignition device for multi-cylinder engines comprising means connected with each cylinder for trapping, holding and returning a portion of the combustion products of the explosion therein, a series of cams operating said trapping device, said cams being mounted upon a common cam-shaft, means for adjusting said cam-shaft upon a cam-rod connected therewith, and operative means connecting said cam-rod with the main shaft of the engine.

11. An ignition device for explosive engines comprising a trap adapted to be placed in direct communication with the cylinder and to receive and hold a portion of the exploded gases under greater pressure and temperature than the gases in the cylinder under their greatest pressure before explosion, means between said trap and cylinder for admitting, holding and releasing the exploded gases into and from said trap, and operating means for said last mentioned means, whereby a small portion of the explosion products is trapped apart from the cylinder at the time of explosion, maintained apart from the cylinder during the compression of the succeeding charge, and returned to the cylinder to ignite such succeeding charge.

12. An ignition device for explosive engines comprising a chamber connected with the cylinder and of small volume relative to the volume included between the end of the cylinder and the piston at the end of the compression stroke, a valve between said chamber and the cylinder, and means for opening said valve immediately before the time for each explosion and closing it after each explosion and before exhaustion of the products of combustion from the cylinder.

13. An ignition device for explosive engines comprising a chamber connected with the cylinder and with the outside air, said chamber being of small volume relative to the volume included between the end of the cylinder and the piston at the end of the compression stroke, a valve between said chamber and the cylinder, means for opening said valve immediately prior to the time for each explosion and closing it after each explosion and before exhaustion of the products of combustion from the cylinder, a valve between said chamber and the outside air, and means for opening said valve immediately after each explosion and closing it prior to the closing of the first mentioned valve.

14. In an ignition device for explosive engines, a chamber, a passage connecting said chamber with the cylinder and having substantially the same cross-sectional area as said chamber, a valve in said passage, means for opening said valve immediately prior to the time for each explosion and closing it after each explosion before exhaustion of the products of combustion from the cylinder, a passage connecting said chamber to the atmosphere, a valve in said passage, and means for opening said valve immediately after each explosion and closing it prior to the closing of the first mentioned valve.

Signed at New York city, in the county of New York and State of New York, this 28th day of July, 1910.

JOHN H. STRINGHAM.

Witnesses:
HERMAN GUSTOW,
KATHRYN M. KILEY.